United States Patent [19]
Foote

[11] 3,932,871
[45] Jan. 13, 1976

[54] FM/CW SURVEILLANCE RADAR SYSTEM WITH RANGE GATING

[75] Inventor: Owen L. Foote, Salt Lake City, Utah

[73] Assignee: Sperry Rand Corporation, New York, N.Y.

[22] Filed: Sept. 11, 1972

[21] Appl. No.: 288,177

[52] U.S. Cl. ........ 343/5 PD; 340/258 A; 340/258 B; 343/7.7; 343/17.5
[51] Int. Cl.² ... G01S 9/02; G01S 9/42; G08B 13/22
[58] Field of Search ............... 343/5 PD, 7.7, 17.5; 340/258 A, 258 B

[56] References Cited
UNITED STATES PATENTS

| | | | |
|---|---|---|---|
| 3,066,289 | 11/1962 | Elbinger | 343/7.7 |
| 3,079,599 | 2/1963 | Caspers | 340/258 A |
| 3,383,678 | 5/1968 | Palmer | 343/5 PD |
| 3,512,155 | 5/1970 | Bloice | 343/7.7 |
| 3,697,989 | 10/1972 | Bailey et al. | 340/258 A |

Primary Examiner—Malcolm F. Hubler
Attorney, Agent, or Firm—Kenneth T. Grace; Thomas J. Nikolai; Marshall M. Truex

[57] ABSTRACT

A single FM/CW radar antenna and accompanying electronics are positioned within a space that is to be guarded. A moving object within the space under surveillance produces a doppler frequency shift in the echo return signal which return signal is, in turn, analyzed for signal content. Through FM and range gating the return signal analysis is selectively adjustable for moving target size and range such that moving targets of below minimum size and/or beyond maximum range are not detected as hostile objects while moving targets of or above minimum size and/or at or within maximum range are detected as hostile objects. Range gating is selectively adjustable to produce an alarm signal by selected size hostile objects within a predetermined range of detection, e.g., of 300 feet, such as a man crawling through the radar beam at a range of 300 feet within an enclosed fenced-in area while not producing an alarm signal by relatively large non-hostile objects without the range of detection, such as a large truck moving through the radar beam at a range of 330 feet outside the enclosing fence or by relatively small non-hostile objects within the range of detection, such as a guard dog moving through the radar beam at a range of 270 feet inside the enclosing fence.

10 Claims, 16 Drawing Figures

RF FRONT END

Fig. 1

FREQUENCY MODULATED CARRIER

Fig. 2

VARACTOR MODULATOR WAVEFORM

Fig. 4

VARACTOR MODULATOR WAVEFORM

Fig. 3

RANGE MODULATION AND MIXER OUTPUT
INTO RECEIVER

UNMODULATED RANGE CURVE

Fig. 7

RANGE CURVES FOR VARIOUS MODULATION INDICES $\beta$

Fig. 9 PREAMPLIFIER

RANGE CHANNEL

RANGE CHANNEL

Fig. 11a

FM/CW CHANNEL

FM/CW CHANNEL

POWER SUPPLY

FM/CW SURVEILLANCE RADAR SYSTEM WITH RANGE GATING

BACKGROUND OF THE INVENTION

The present invention relates to a field of surveillance systems and in particular to those surveillance systems that utilize a radar system to provide the monitoring of moving objects within a predetermined space that is to be guarded. The prior art includes television surveillance systems such as that of the Kartchner U.S. Pat. No. 3,531,588 which includes an automatic television apparatus for continuously scanning a security-protected scene for periodically storing a complete frame of live television signals representing the scanned scene. The live television signals and the stored television signals are amplitude-compared and pulses representing any differences are coupled by digitalized logic circuits to alarm devices. Upon an alarm, the pulses actuate a gated limiter through which the television signals are applied to a picture tube whereby the signals are clamped to a white level upon each actuation thus outlining any intrusion within the scanned scene with a white border. Another type of surveillance system is that of the Schwartz, et al., U.S. Pat. No. 3,314,066 in which a CW microwave transmitter is placed at one extremity of the scene to be guarded for sending energy to a reflector at the other extremity of the guarded scene. In this system, the intensity of the transmitted signal is modulated by hostile objects that enter the radar beam between the transmitting antenna and the reflector. The modulation energy of the reflected radar beam is analyzed for target size to produce an alarm signal when a hostile object is detected.

Still another type of surveillance system is that of the J. D. Dautel et al. patent application Ser. No. 202,997, now U.S. Pat. No. 3,815,131, assigned to the same assignee as is the present invention, in which two CW microwave transmitter antennas are positioned facing one another within a space that is to be guarded. Each transmitting antenna is located within the radar beam of the other facing transmitting antenna and operates at the same or a different CW frequency. A moving object within the surveillance space produces a doppler frequency shift in the echo return to each transmitting antenna which produces a detected target signal. AND-/OR logic gates responsive to the detected target signals from each radar system provide an alarm or alert condition. The radar system has resultant range vs. object size characteristic over the surveillance space so that a small moving object, such as a small animal, will produce a detected signal in only one of the radar systems thereby indicating an alert condition while a large moving object, such as a person, will produce a detected signal in each of the radar systems thereby indicating an alarm condition. Radar signal returns from a large target, such as a moving vehicle, beyond the desired surveillance range will produce a detected signal in only one of the radars and will produce an alert signal but not an alarm signal.

SUMMARY OF THE INVENTION

The radar system of the present invention includes in the illustrated and preferred embodiment an FM/CW channel and a range channel; both channels modulate the same CW carrier operating at 10.525 GHz by applying separate modulation signals to the varactor input of a gunn oscillator. The FM/CW channel frequency-modulates the carrier signal at a 22 KHz rate causing a frequency shift that is proportional to the modulation index selected. The range channel is frequency shift keyed (FSK) by changing the carrier frequency 8.0 MHz during a 0.125 $\mu$s pulse period every 12.5 $\mu$s. This two-channel signal is transmitted throughout the area under surveillance the same as in a conventional radar transmitter. Energy reflected from a moving object is returned to the radar antenna with a shift in frequency that is proportional to the velocity of the moving object. The transmitted and received signals are then mixed together in a mixer diode and the $J_1$ Bessel function (1st sideband) is selected by an active filter and amplified. The dopper signal is then extracted through an FM demodulator, amplified, compared against a reference amplitude, and sent to the alarm signal circuitry when the established threshold level is exceeded.

Range information is obtained by gating out dopper signals that occur beyond the present range of interest. Conventional radars obtain range information by creating a narrow pulse of transmitted energy and turning the transmitter OFF at all other times. This creates a time reference to measure the elapsed time for the pulse to return. In an FM/CW system, pulsing the transmitter ON and OFF would lose all of the major advantages of modulation. Therefore, in the present invention ranging is accomplished by leaving the transmitter ON continuously and shifting the frequency at a keyed rate. Frequency shift keying (FSK) creates a time reference to begin range gating, but does not affect the operation of the CW channel since the frequency shift is out of the pass band of the CW receiver. When energy is returned from a moving object, the 8.0 MHz difference signal out of the mixer diode is selected in a band pass filter and sampled in a sample-and-hold circuit. The sample-and-hold circuit is gated ON only during the range of interest; therefore no signal returning after the range gate is shut OFF will be processed. The output is then doppler signal proportional to the velocity of the moving target within the range of interest only. The output of both channels is then fed to a NAND gate which allows the FM/CW channel signal to initiate an alarm signal only when a signal is also present in the range channel.

DESCRIPTION OF THE PREFERRED EMBODIMENT

Theory of Operation

The surveillance of intrusion radar system of the present invention utilizes the doppler principle relying upon the shift in signal frequency that occurs when a radio frequency (RF) signal bounces off or is reflected by a moving object. The radar system transmits a continuous wave (CW) signal in the X band frequency spectrum and thru the use of frequency modulation (FM) techniques extracts signals that are proportional to the size and velocity of a moving object that is detected by the RF field.

When an introducer enters the radar system's intrusion-detection zone, two signals are generated: the first signal, called the CW dopper signal, is independent of the range at which the intruder enters the RF field; the second signal, called the range doppler signal, is generated only when the intruder is within the range of interest. Both signals must be present before an alarm signal will be effected. The advantage of this technique is that the movement of non-hostile objects (intruders beyond the range of protection) does not generate nuisance alarm signals as in conventional doppler systems.

Figure 1:
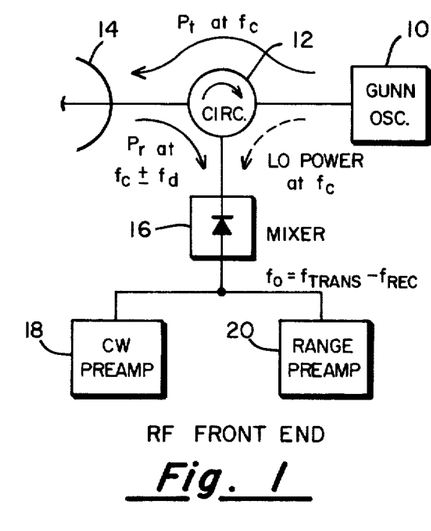
FIG. 1 is a diagrammatic illustration of the radar system of the present invention.

The intrusion radar system is comprised of three basic parts diagrammatically illustrated in FIG. 1: an RF front end; a CW channel; and, a range channel. The RF/CW energy is created by a solid state, gunn-effect oscillator 10 which is varactor tuned for frequency modulation. This CW energy is radiated thru a circulator 12 and a high gain directional antenna 14 to cover the area under surveillance. The returning or reflected signal is received in the same antenna 14 and carried thru the circulator 12 to the mixer 16. Local oscillator power is supplied to the mixer 16 by leakage of the transmitted signal thru the isolation port of the circulator 12. A small DC bias + V is also supplied to the mixer 16 to obtain an optimum receiver signal/noise figure. The mixer 16 output frequency $f_0$ will then be the difference frequency between the transmitted signal frequency $f_{trans}$ and the received signal frequency $f_{rec}$; $f_0 = f_{trans} - f_{rec}$. If no frequency modulation were applied, the mixer 16 output signal frequency would simply be the doppler frequency resulting from any moving target residing in the radar beam.

The radar system employs two FM signal waveforms to obtain unique performance characteristics. The first modulation signal is sinusoidal and is used in the FM/CW channel to aid in the discrimination between, e.g., human-size intruders and small, animal-size intruders. The second modulation signal is in the form of frequency shift keying (FSK) and is used in the range channel to determine if any intruder is within the range of the protection area. Since each separate modulation signal presents little effect upon the other, they will be discussed separately below.

Two major advantages occur when frequency modulation is employed in the FM/CW channel:

1. A lower receiver signal/noise figure occurs, resulting in increased range capability and better discrimination between nuisance alarms and real intruders.

2. Signals returning from close-in targets are suppressed, causing a significant improvement in the response curve of returning signals versus range.

Both of these advantages will be discussed in detail in the following section Performance Characteristics.

Figure 2:
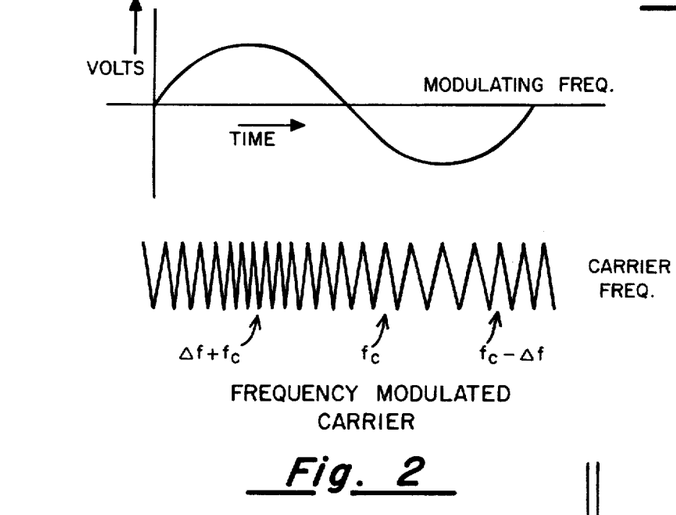
FIG. 2 is an illustration of the frequency modulated carrier.

This type of frequency modulation is accomplished by applying a sinusoidal signal to the varactor diode in the gunn oscillator 10. The varactor diode is designed to provide an increase in carrier frequency that is proportional to an increase in varactor diode voltage. The inverse is also true as shown in FIG. 2. If the varactor diode sensitivity is 5 MHz/volt, for example, and the $f_m$ is 20 KHz, then a 20 millivolt $f_m$ signal would shift the carrier by $\Delta f = $ (5 MHz/volt) $\times$ 20 MV = 100 KHz. This frequency shift $\Delta f$ determines the modulation index $\beta$. For narrow band FM systems the modulation index, $\beta$, is defined as $$\beta = \frac{\Delta f}{f_m}.$$

As can be seen, $\beta$ can be modified at the operator's discretion by merely raising or lowering the voltage of $f_m$. In general, a lower modulation index $\beta$ provides flatter range-response curves, but also provides less signal return. (See FIG. 7)

Figure 3:
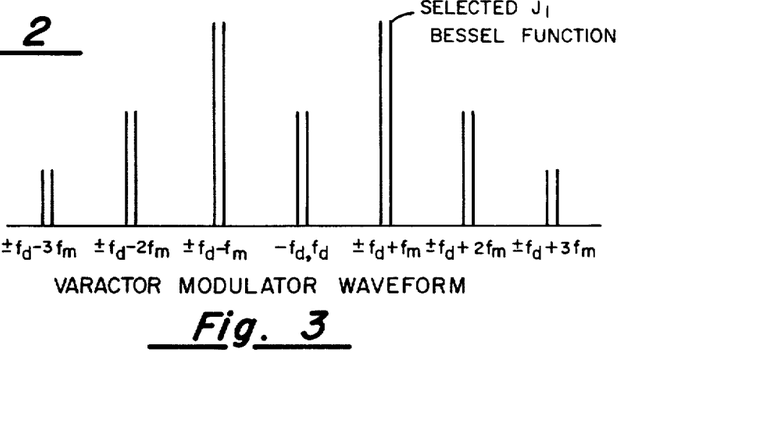
FIG. 3 is an illustration of the mixer output spectrum.

As this frequency modulated (FM) signal is transmitted, it receives an additional modulation resulting from the doppler effect. The returning signal is composed of three frequencies: the carrier frequency, $f_c$, the modulating frequency, $f_m$, and the doppler frequency, $f_d$. This returning signal is then mixed with the transmitted signal, $f_t = f_c \pm f_m$. Mixer theory states that when two signals are superimposed across a non-linear device (such as a detector diode biased in the non-linear region) the original frequencies plus all of the sum and difference frequencies result. The mixer output thus provides $f_d + (f_d + f_m) + (f_d + f_m) + (f_d + 2f_m) + (f_d - 2f_m) + \ldots$ as frequencies available for use as desired. This is shown in FIG. 3. By selecting the first sideband ($J_1$) component, $(f_d + f_m)$, called the $J_1$ Bessel function, it can be shown that the amplitude of this signal contains parameters that compensate for the adverse range effects.

The mixer 16 output is amplified, the $J_1$ component selected thru a band pass filter, and then inserted into a phase sensitive demodulator. To obtain a true FM demodulator, a reference signal must be introduced with the incoming signal to be demodulated. This is accomplished by amplifying and squaring the $f_m$ signal, then shifting the phase until it is 90° with respect to the incoming signal. The output of the demodulator is again the sum and difference frequencies of $f_d$ and $f_m$. By use of a low pass filter, only the doppler frequency passes on to be processed.

After amplification, the doppler frequency signal is compared to a reference voltage representing a minimum threshold. This threshold reference is adjustable to allow exclusion of nuisance alarms, or small animals, etc. If the signal exceeds the threshold it is converted to a digital signal in a retriggerable one-shot multivibrator. The circuit arrangement is such that a logic level 0 occurs for the duration of the time that the intruder is in the radiation pattern of the radar beam.

This logic signal output of the CW channel is coupled to a NAND gate with the logic signal output from the range channel. If both channels provide as outputs a logic 0, the NAND gate provides as an output a logic 1 which triggers the alarm circuits. This method requires that logic 0 signals from both channels be concurrently present at the NAND gate to cause an alarm signal.

Figure 4:
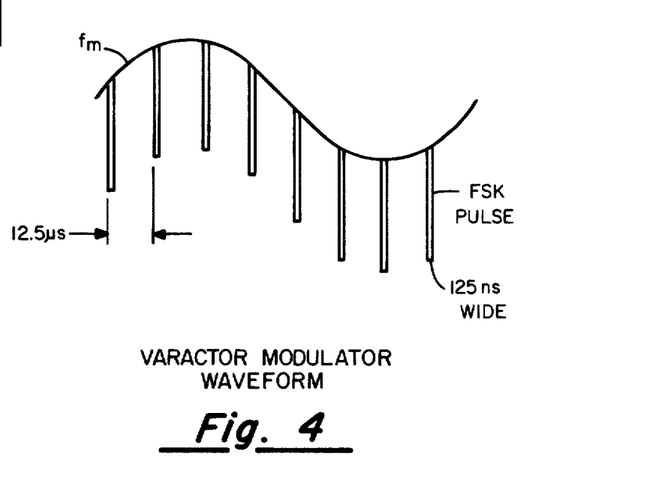
FIG. 4 is an illustration of the varactor modulator waveform.

In the range channel the modulation is achieved by frequency shift keying (FSK) the carrier signal. This is accomplished by applying a pulse to the varactor diode input of the gunn oscillator 10. Since two FM waveforms are employed, both signals are amplitude modulated prior to insertion on the varactor diode input. The resulting waveform is shown in FIG. 4.

The pulse amplitude is adjusted to provide an 8 MHz shift in carrier frequency during the duration of the pulse. The pulse width is set at 0.125 μs. The purpose of a 125 nano-second (ns) pulse width is to reduce the transmitted frequency by one cycle during the pulse width. This effect can best be visualized by observing that the period of an 8 MHz sine wave is 125 ns. Then for each 125 ns of time only one cycle of the 8 MHz wave can be seen. Each pulse will then remove one cycle from the RF carrier.

Figure 5:
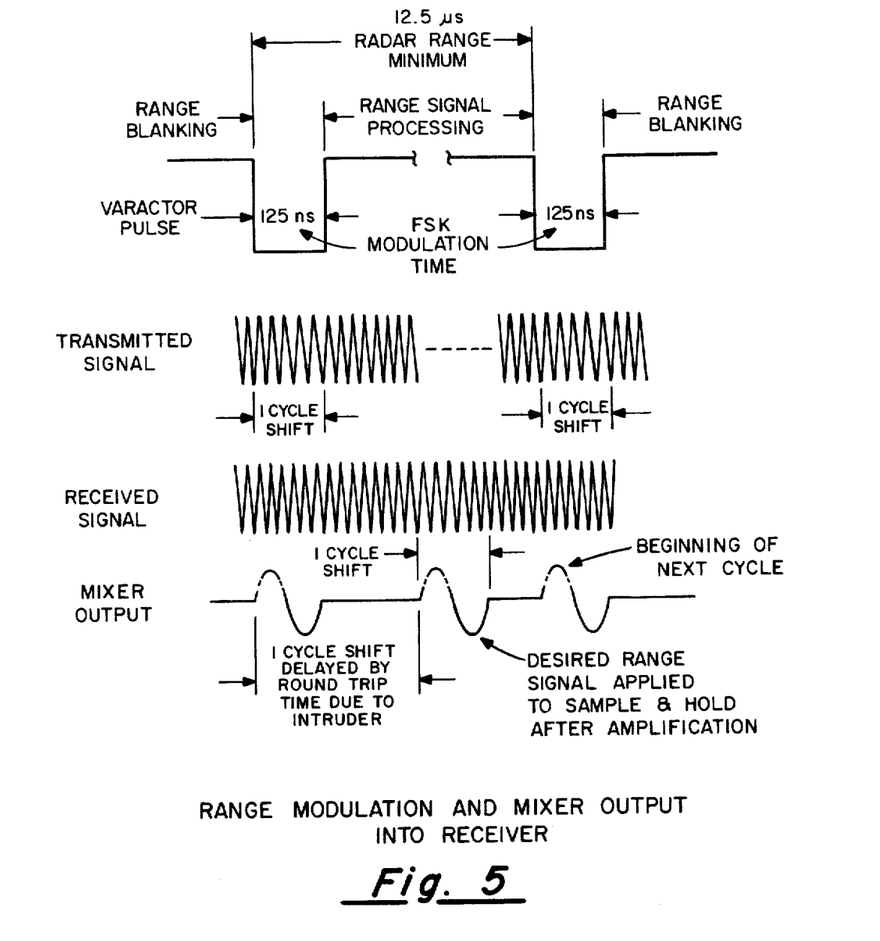
FIG. 5 is an illustration of the range modulation and mixer output.

The frequency modulated carrier is transmitted and later received with the conventional doppler frequency shift, and introduced at the mixer 16 for comparison with the transmitted signal as in the CW channel case. The mixer 16 output frequency spectrum will contain all of the frequencies previously discussed including a new set of frequencies related to the 8 MHz modulation. By referring to FIG. 5, it can be observed that the 8 MHz difference signal will be added to the mixer 16 output whenever the received signal is delayed in time from the transmitted signal. Since the modulation only occurs for 125 ns, only one cycle of the 8 MHz difference will appear at the mixer output. Calculations show that a range of 300 feet provides a round trip delay time of 0.6 μs. If the modulating pulse repetition frequency (PRF) is chosen at 80 KHz, for example, then 12.5 μs of round trip time would be allowed before ambiguous ranging would occur.

The entire mixer 16 output spectrum is introduced into the preamplifier where it is separated into the FM/CW channel 18 and the range channel 20. The FM/CW channel 18 selects only the FM frequency signal and the range channel selects the 8 MHz difference frequency signal; both frequency signals contain doppler frequency modulation. The range preamplifier contains a blanking circuit to inhibit signals being processed during the FSK modulation time and clears the receiver to begin receiving range information.

The range signal is next processed thru a gated sample and hold circuit. The purpose of this circuit is to sample the peak of the cycle that occurs during a specified range gate width and hold it until the next cycle arrives. The output of this circuit is then filtered in a low pass filter and amplified as range doppler information. The remaining circuitry is identical to the FM/CW channel and the signal is processed similarly.

Performance Characteristics a. Frequency response

In a doppler-radar system the doppler effect causes the signal reflected by a moving target to be shifted in frequency by an amount $$f_d = \frac{2v_r}{\lambda} \cos \theta$$

where
$f_d$ = doppler frequency in Hz
$v_r$ = relative velocity between radar and target in meters/sec.
$\lambda$ = wavelength of carrier frequency in meters
$\theta$ = relative angle between moving target and radar line of sight.

At x-band frequencies, assume $\lambda = 3$cm. If an object is moving in the direction of the radar at 10 miles/hr. then $\cos \theta = 1$ and
$v_r = 4.78$ m/sec
then $$f_d = \frac{2(4.78)}{.03} = 319 \text{ Hz max.}$$

Considering a man to be crawling at a rate of 1 inch per second then
$f_d = 1.7$ Hz.

If a man crawls across the beam ($\theta = 90°$) the frequency could be reduced to zero.

It can be seen from the foregoing discussion that the low frequency response is critical. If the transmitter frequency were not at $x$ band, but at a lower band (increasing $\lambda$), the low frequency response would require considerable complexity in circuit design and would be subject to drift with age and temperature.

The radar system is designed for good low frequency response and presently has a 300 Hz signal bandwith. Field tests have shown that a man cannot walk, run, or crawl thru the beam at any velocity without causing an alarm.

b. Signal sensitivity

When a directional antenna is used both to transmit and receive an RF signal, the radar range equation describes the received signal power as $$P_r = \frac{P_t G^2 \lambda^2 \sigma}{(4\pi)^3 R^4}$$

where
$P_t$ = transmitted power
$G$ = antenna gain
$\lambda$ = wavelength
$\sigma$ = radar cross section
$R$ = range of target from antenna.

Figure 6:
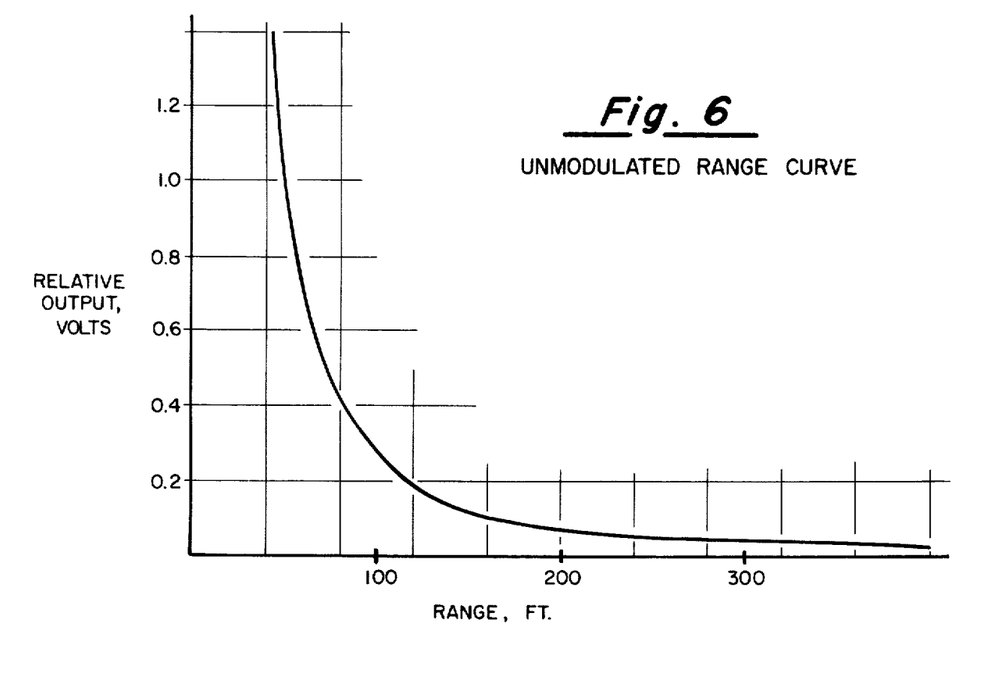
FIG. 6 is an illustration of the unmodulated range curve.

Assuming that a particular intruder presents a constant radar cross sectional area as he moves thru the area of coverage, the received power will vary only as a function of range. The received power than becomes $$P_r = \frac{K}{R^4}$$

where $K$ is a constant independent of range. This curve is shown plotted in FIG. 6.

Figure 7:
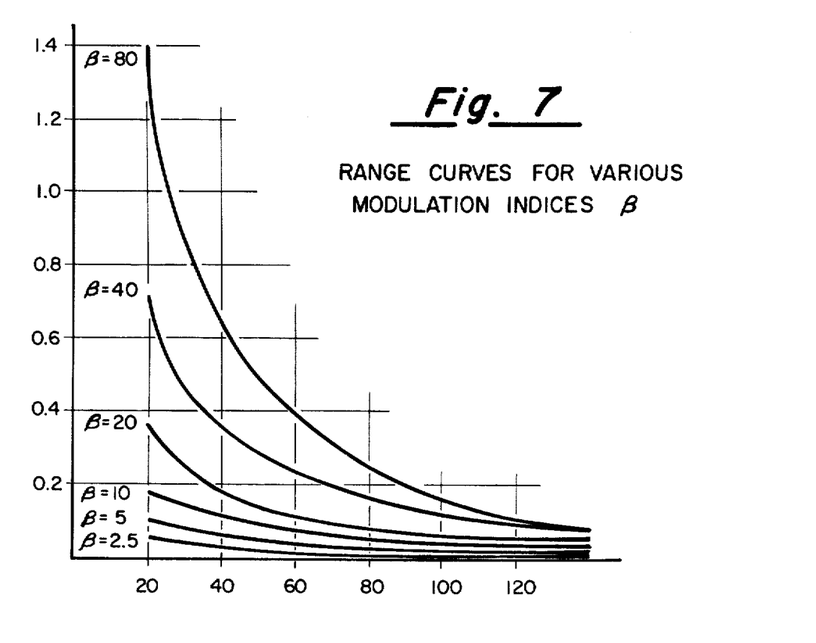
FIG. 7 is an illustration of a range of curves for various modulation indices $\beta$.

The major disadvantage to an unmodulated CW radar is that small targets in close to the radar will reflect as much signal back as a large target at long range. If the alarm threshold is set to reliably alarm on a man at 350 feet, then birds or small animals at 100 feet or less will probably cause an alarm also. This effect is greatly reduced by frequency modulation (FM) in the FM/CW channel. Since signals returning from close-in targets are suppressed in amplitude, the range curve flattens considerably and the alarm threshold can be adjusted to exclude small animals and yet reliably detect a man crawling at 350 feet. The range curves for various modulation indices are shown in FIG. 7. It should be noted, however, that as the modulation index $\beta$ is lowered to obtain a flatter response curve, the return signal is decreased and eventually becomes buried in the system noise. The noise is comprised of two basic parts; the receiver noise figure as defined by the radar configuration, and the background noise caused by movement in the environment. If there is a significant amount of movement due to wind, etc., the modulation index would have to be raised to provide a sufficient signal-to-noise (S/N) ratio to avoid false alarms.

A second advantage of frequency modulating the carrier is lower receiver noise. In the creation of an RF oscillator, an appreciable amount of random noise is created at or near the frequency of oscillation. If in the detection of the received signal, mixing can be accomplished at a frequency that is removed from the noisy carrier, a low noise figure can be obtained. By selecting the first sideband as the desired signal, mixing is performed at a frequency of $f_m$ from the carrier. Basically this effect results in greater range (since the noise is down, the signal can be reduced also) and less nuisance and false alarms.

c. Range gating

As stated previously, when frequency modulation is employed, particularly with low modulation indices, increased range results. With low noise and increased range, large targets as long ranges becomes significant. To avoid this, range gating is introduced. As explained in the Theory of Operation, the range channel and the FM/CW channel operate independently. This allows full use of the FM capability but only allows it to alarm if a signal is also present in the range channel. Calculations show that the round trip time for 300 feet is approximately 600 nanoseconds. This results in a linear relationship of 0.5 feet/ns. Since the slope of the range gate pulse is about 20 ns, and circuit recovery time is an additional 10 ns, the shortest range cutoff is about 15 feet. Measurements show that range cutoff lies between 15 and 30 feet beyond the end of the range gate, depending upon the size and distance of the moving object.

Circuit Description

The following discussed figures 8, 9, 10, 11 and 12 illustrate one preferred method of effecting the radar system of the present invention disclosing the advantages and features discussed above.

Figure 8:
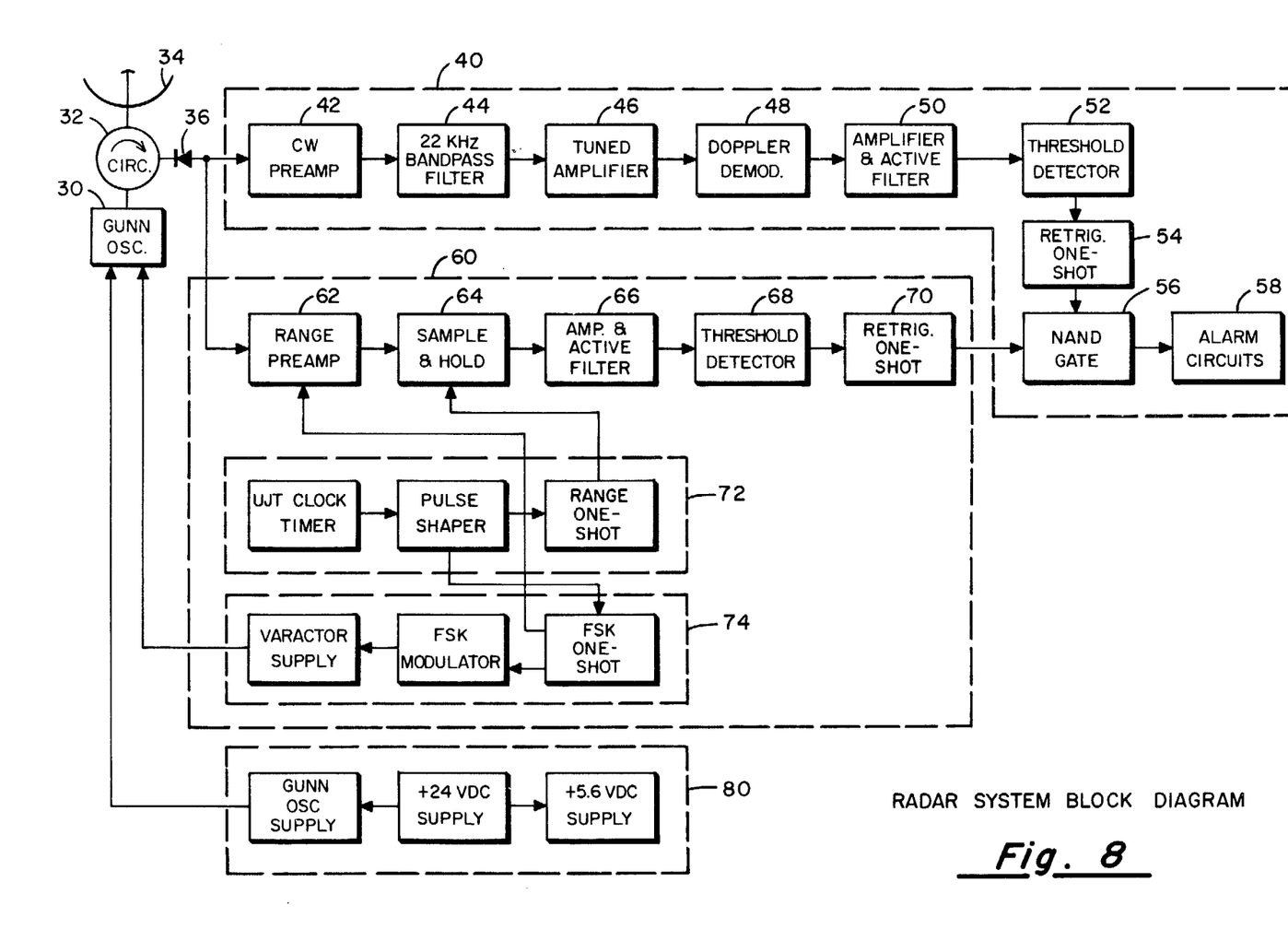
FIG. 8 is a block diagram of the radar system of the present invention.

Referring to the drawings and particularly to FIG. 8, the radio frequency (RF) energy is generated in a gunn effect oscillator 30 at a frequency of 10.525 gigahertz (GHz). The RF energy is directed through a circulator 32 to a highly directional antenna 34. Antenna 34 is a parabolic sector displaying an extremely narrow beam width in azimuth and a wide beam width in elevation which radiates the energy in a fence-like pattern throughout the area under protection. A portion of the energy reflected from a moving target is captured in antenna 34 and processed through circulator 32 to a mixer diode 36 which mixes the transmitted and received frequencies and creates an entire spectrum of sum and difference frequencies.

The mixer output signal is impressed simultaneously upon the FM/CW channel 40 and the range channel 60. FM/CW channel 40 includes a continuous wave (CW) preamplifier 42, a band pass filter 44 to select only the $J_1$ Bessel component of frequency, an amplifier 46 tuned to that frequency, a demodulator 48, a doppler amplifier and filter 50, a threshold detector 52 and a single shot multivibrator 54 to stretch the alarm signal. Also included in this channel is a NAND gate 56 and alarm circuitry 58. Range channel 60 contains circuits to generate frequency shift keying (FSK) 72 and gating pulses 74. Also included in range channel 60 are a range preamplifier 62, a peak detecting sample-and-hold circuit 64, a doppler amplifier and filter 66, a threshold detector 68, and a single shot multivibrator 70. Power for the radar is received from a 30 VDC supply and is regulated in the power supply 80 to provide regulated voltages of +24 VDC, +9VDC and +5.6 VDC.

Figure 9:
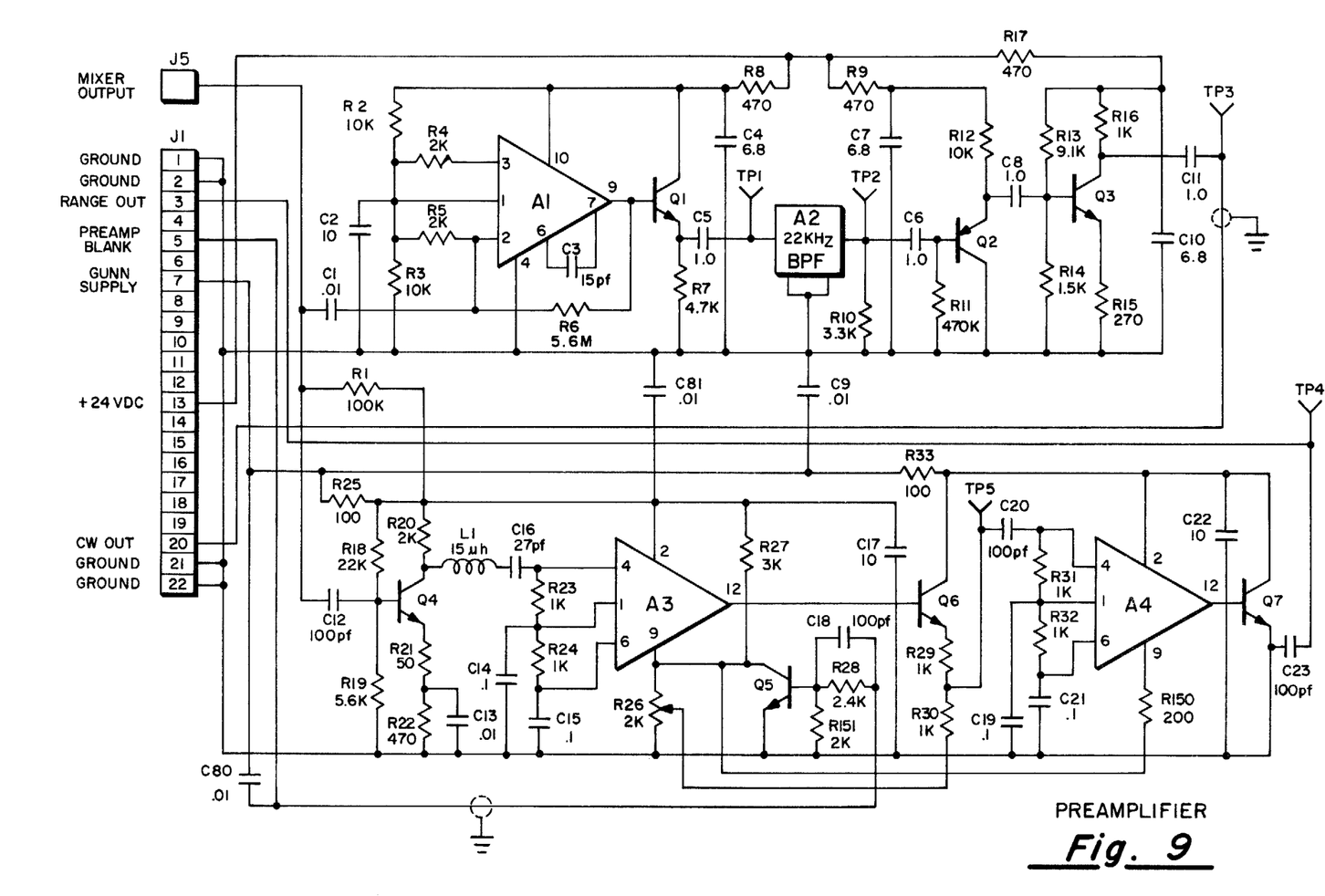
FIG. 9 is a schematic diagram of the preamplifier board of the present invention.

In particular, the components shown in the block diagram of FIG. 8 may be represented by the circuitry shown in FIGS. 9, 10, 11 and 12. Referring to FIG. 9, the preamplifier is comprised of a CW channel and a range channel. The mixer output is directed to both channels in parallel. The mixer output is amplified in the CW channel by an integrated circuit operational amplifier A1 with approximately 60db of gain and fed through an emitter follower Q1 to a narrow band pass filter A2 which selects the desired $J_1$ sideband. Transistors $Q_2$ and $Q_3$ amplify the resulting signal about 12db for further processing.

The mixer output is amplified in the range preamplifier by multistage components consisting of transistors Q4, Q6, Q7 and integrated circuits (IC) A3 and A4 which are wideband video amplifiers. The total range preamplifier gain is set at 60db. Transistor Q5 is employed to gate the preamplifier OFF during the frequency shift keying period which precludes the possibility of any undesired amplitude modulation affecting the range signal.

Figure 10:
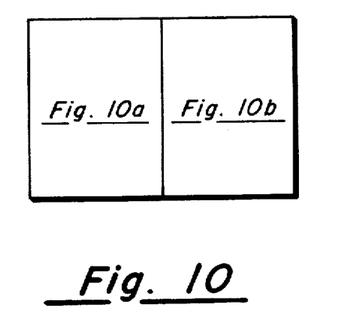
FIG. 10, comprised of FIG. 10a and FIG. 10b, is a schematic diagram of the range channel board of the present invention.
Figure 10A:
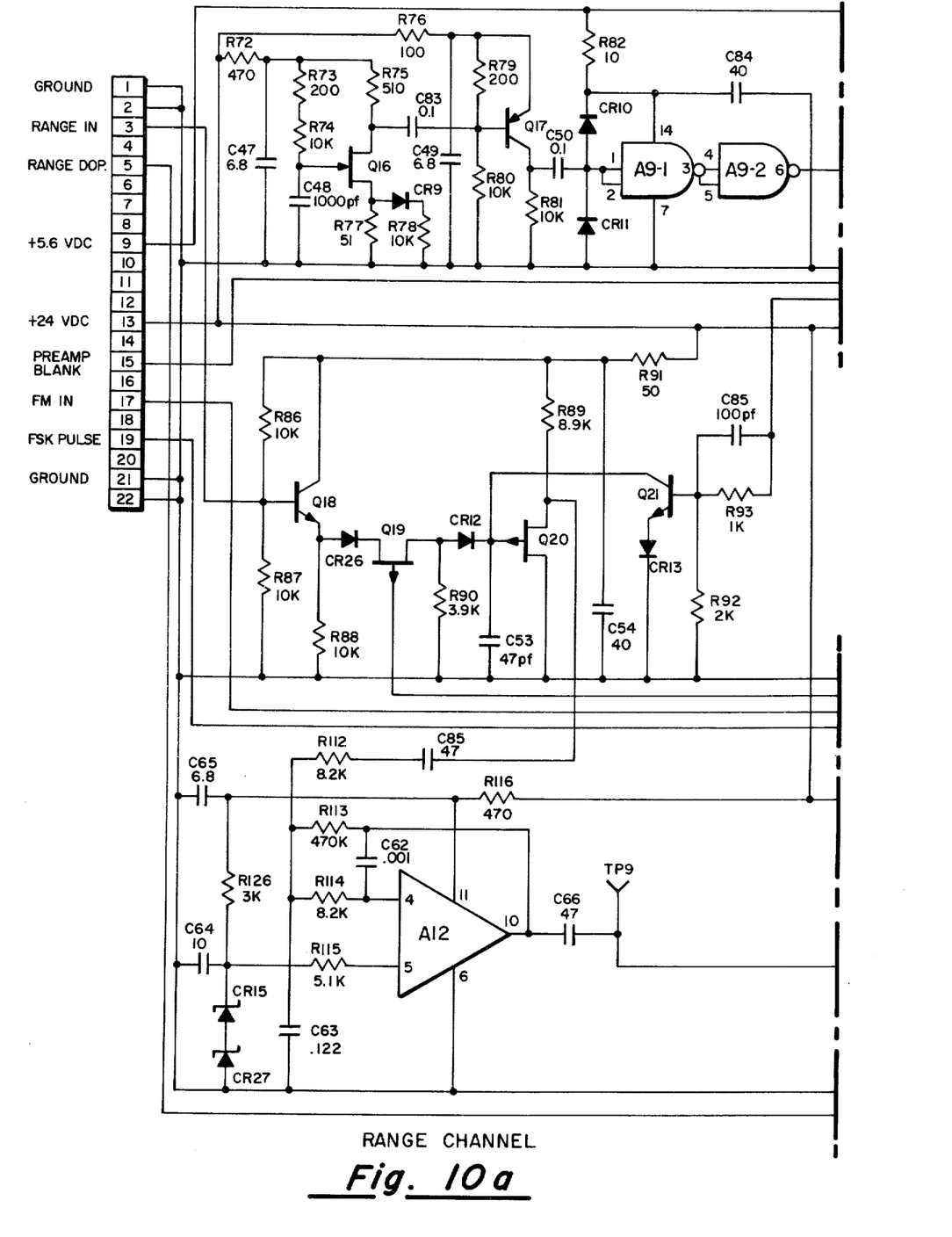
Figure 10B:
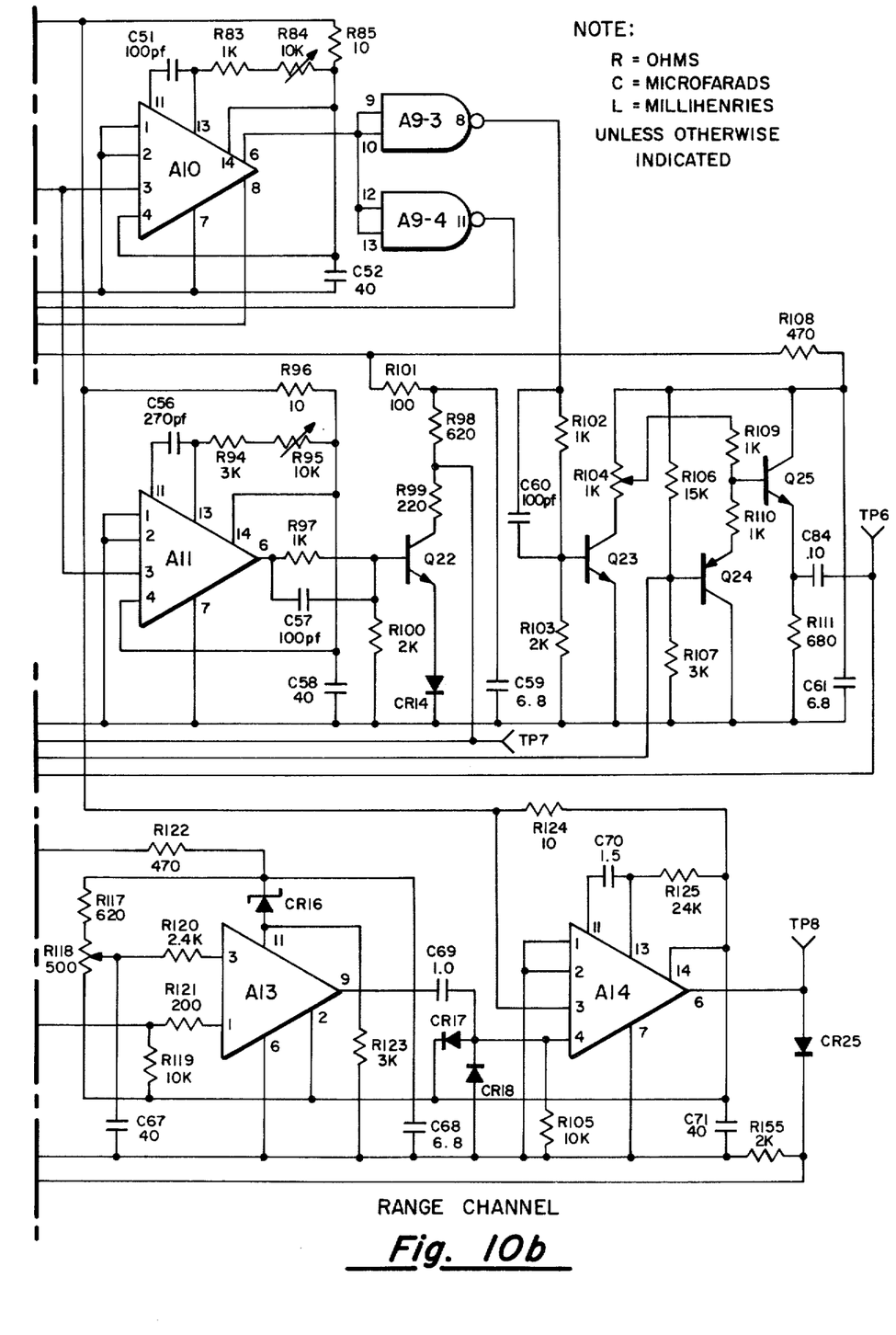

Referring to FIG. 10, range channel circuitry, ranging information is obtained by first creating a series of reference pulses. A unijunction transistor oscillator, Q16, creates a reference trigger pulse at an 80 kilohertz range. This signal is amplified in transistor Q17 and shaped in an IC NAND gate. This output is applied to each of the two IC single shot multivibrators independently. Circuit A10 generates a pulse 125 ns wide which is inverted in circuits A9-3 and A9-4 and used as the FSK reference pulse. This signal is also used as the range blocking pulse driving transistor Q5 in the range preamplifier of FIG. 9. This pulse is applied to an amplitude modulator (transistors Q23, Q24 and Q25) and modulated with the FM voltage (to be discussed with FIG. 11) to be used for frequency shift keying.

Circuit A11 generates a pulse whose width is variable depending upon the setting of potentiometer R95. This pulse determines the desired range of protection and is used to gate the sample-and-hold circuit (transistors Q18, Q19, Q20 and Q21) during the desired sample time only.

The output signal from the range preamplifier is inserted directly into the sample-and-hold circuit which detects the most positive peak occurring within the width of the range gate plate. Once the peak has been detected it is held at that potential by capacitor C53 until the beginning of the next cycle, at which time transistor Q21 discharges C53 and a new cycle begins.

This signal output is filtered, extracting only the change in amplitude, and amplified as range doppler information. The filtering and amplification occurs in an integrated circuit operational amplifier, A12, and is inserted on circuit A13, a high speed voltage comparator for comparison against a reference threshold. If the signal amplitude exceeds the reference a pulse is applied to A14, a single shot multivibrator where it is stretched to approximately 1.5 seconds. Since the system is designed to detect a man crawling at his slowest speed, stretching of the pulse is necessary to provide coincidence with the CW information received from the same moving target. The output from circuit A14 is combined in a NAND gate, Q15, FIG. 11, with the FM/CW channel signal such that the signal must be received in both channels simultaneously to cause an alarm.

Figure 11:
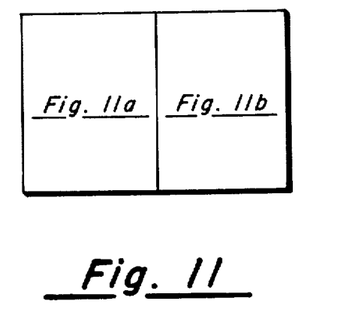
FIG. 11, comprised of FIG. 11a and FIG. 11b, is a schematic diagram of the FM/CW channel board of the present invention.
Figure 11A:
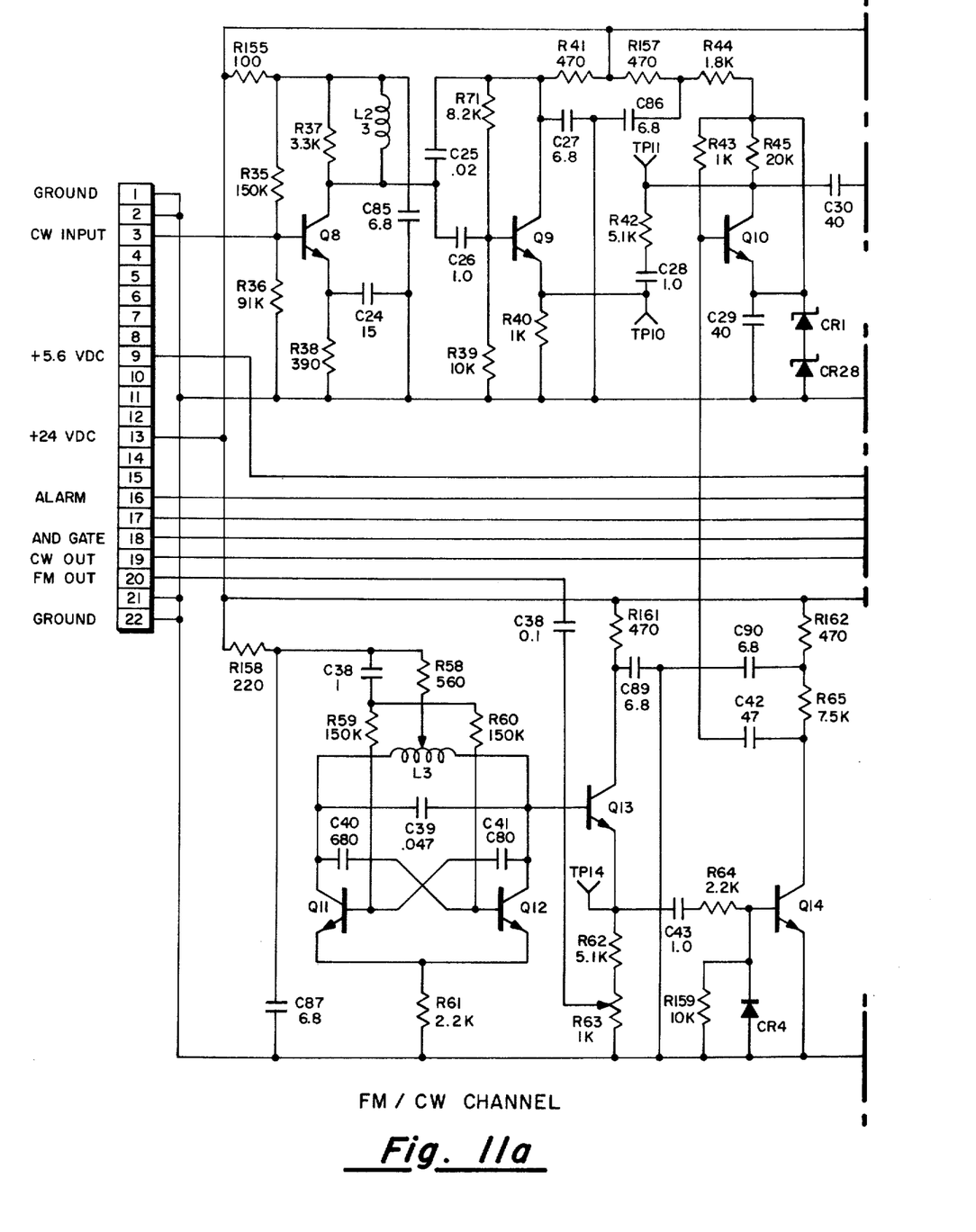
Figure 11B:
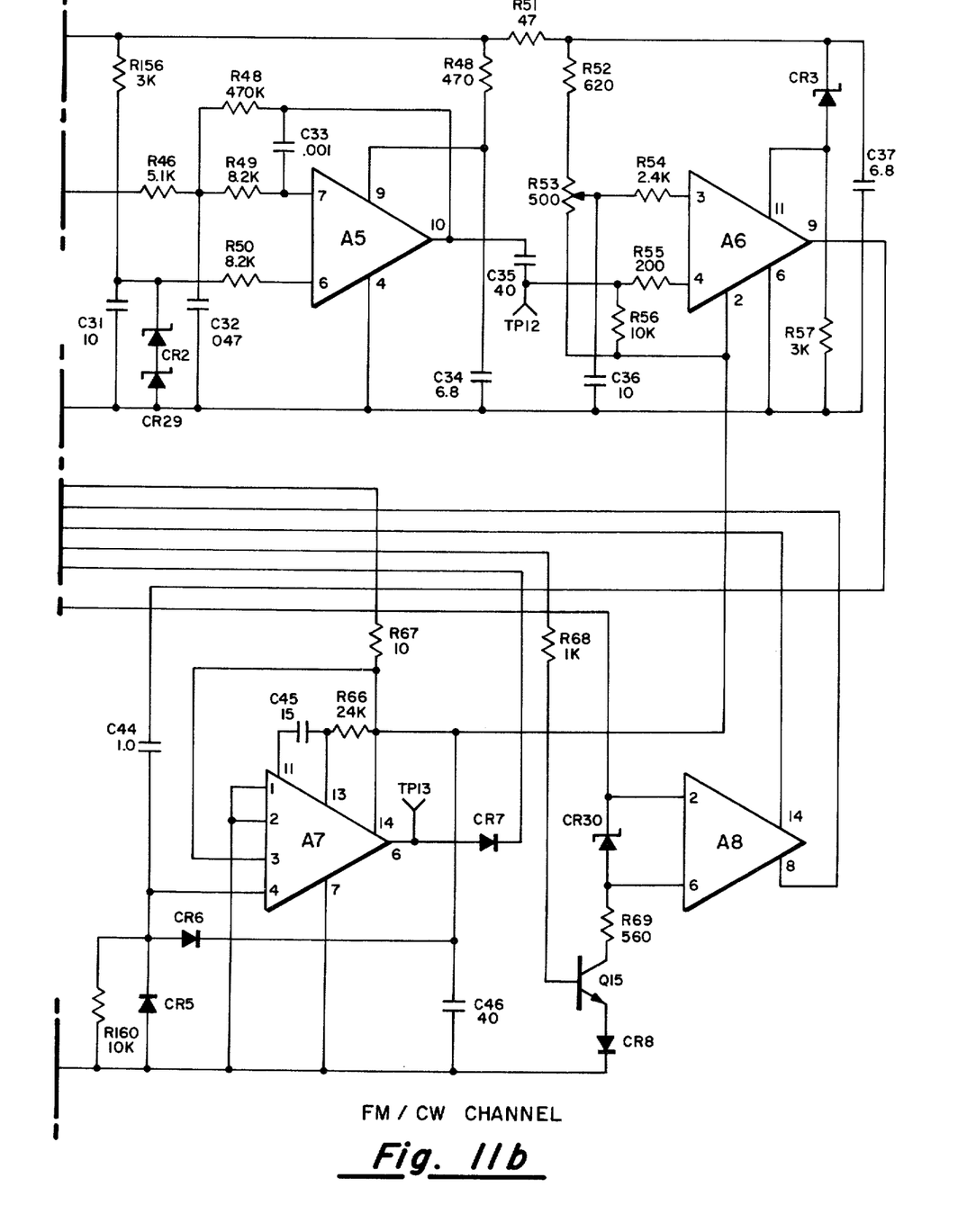

Referring to FIG. 11, FM/CW channel circuitry, transistors Q11 and Q12 form an oscillator which generates a frequency equal to the $J_l$ sideband selected in the FM/CW preamplifier of FIG. 9. This signal, called FM, is used to frequency modulate the gunn oscillator and is coupled through emitter follower Q13 to the modulator in the range channel, transistors Q23, Q24 and Q25 of FIG. 10. Potentiometer R36 sets the amplitude of the FM voltage which allows for a variable modulation index $\beta$. (See FIG. 7.) This same voltage, FM, is directed through a squaring circuit, transistor Q14, and used as a reference voltage for a phase sensitive demodulator, Q10.

The signal from the FM/CW preamplifier is amplified in a tuned amplifier, Q8 and Q9, and inserted into the phase sensitive demodulator, Q10. The doppler frequency component is extracted and amplified in an active filter, A5 which is an integrated circuit operational amplifier.

The resultant doppler signal is compared against a reference threshold in a high speed differential comparator A6. If the input signal exceeds the reference, a pulse is applied to A7, a single shot multivibrator where it is stretched to approximately 1.5 seconds. The output is combined with the range channel output in a NAND gate Q15 waiting for coincidence in both channels. When both channels are in the alarm condition, there is an absence of a voltage at the base of the transistor Q15 and the relay becomes unenergized, causing an alarm.

Figure 12:
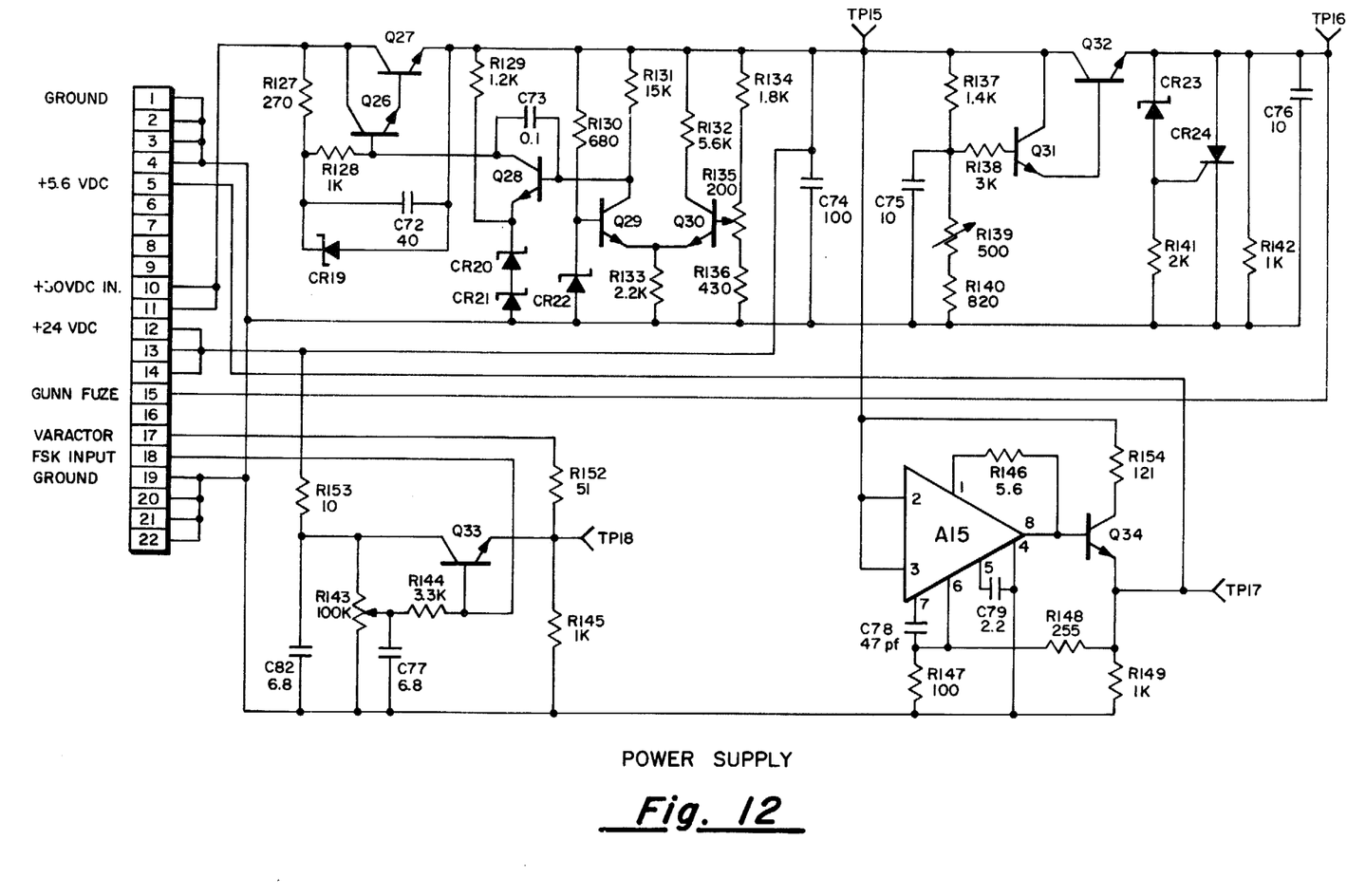
FIG. 12 is a schematic diagram of the power supply board of the present ivention.

Referring to FIG. 12, power supply circuitry, transistors Q26 through Q30 provides a regulated +24 VDC for all circuitry. From this voltage a +9 VDC is obtained through Q31 and Q32 to drive the gunn oscillator. Diodes CR23 and CR24 provide overvoltage protection to the gunn diode. Circuit A5, an integrated circuit regulator, provides a regulated +5.6 volts DC for the integrated circuits. Transistor Q34 allows for high current outputs on the +5.6 volt regulated line.

To obtain frequency shifts on the gunn oscillator for frequency shift keying and frequency modulation on the CW channel, a varactor diode is inserted in the gunn oscillator cavity. Both the FM voltage and the FSK pulse are modulated in the modulator discussed previously and then superimposed upon a variable DC voltage in the varactor voltage supply, transistor Q33. Potentiometer R143 allows for any desired varactor voltage which gives optimum frequency shift.

What is claimed is:

1. An FM/CW surveillance radar system with range gating, comprising:

an antenna for continuously transmitting a transmitted signal and for receiving a received signal;

an FM/CW channel coupled to said antenna for receiving said received signal and including means for converting from said received signal a doppler signal above a threshold level to an FM/CW channel alarm signal;

a range channel coupled to said antenna for receiving said received signal and including:

means for frequency shift key (FSK) processing a CW signal, which is to be transmitted by said antenna, only during a range blanking period;

range gate blanking means for inhibiting said received signal from being processed by said range channel only during said FSK process; and,    means for converting from said received signal a range doppler signal above a threshold level to a range channel alarm signal;

alarm means coupled to the alarm signals generated by said FM/CW channel and said range channel for generating an alarm signal only when said FM/CW channel and said range channel alarm signals are concurrently coupled thereto.

2. An FM/CW surveillance radar system with range gating, comprising:

an antenna for continuously transmitting a transmitted signal and for receiving a received signal;

oscillator means coupled to said antenna for generating an FM/CW signal of a frequency $f_c \pm f_m$;

an FM/CW channel coupled to said antenna for receiving said received signal and including:

means for passing only the doppler signal of a frequency $f_d$ from said received signal that is above a threshold level;

means for converting said passed doppler signal to an alarm signal;

a range channel coupled to said antenna for receiving said received signal and including:

means for frequency shift keying (FSK) and FM/CW signal of a frequency $f_c \pm f_m$ by an FSK signal of a frequency $f_k$ in which said FSK signal is of a pulse duration $1/f_k$;

range gate blanking means for inhibiting any received signals from being processed by said range channel during said FSK pulse duration;

means for generating a range doppler signal from said received signal;

means for passing only a range doppler signal that is above a threshold level;

means for converting said passed range doppler signal to an alarm signal;

alarm means coupled to the alarm signals generated by said FM/CW channel and said range channel for generating an alarm signal only when said two alarm signals are concurrently coupled thereto.

3. An FM/CW surveillance radar system with range gating, comprising:

a transmit-receive antenna;

oscillator means coupled to said antenna for generating a carrier signal of a frequency $f_c$;

modulator means coupled to said oscillator means for frequency modulating said carrier signal by a frequency modulating signal of a frequency $f_m$;

an FM/CW channel coupled to said antenna for receiving a received signal and including:

means for selecting the $J_l$ component signal of a frequency $f_d + f_m$ of said received signal;

means for FM demodulating said $J_l$ component signal;

means for passing only a selected doppler signal of a frequency $f_d$ from said FM demodulated $J_l$ component signal;

means for converting said doppler signal to an alarm signal;

a range channel coupled to said antenna for receiving a received signal and including:

means for frequency shift keying (FSK) and frequency modulating signal of a frequency $f_m$ by a pulsed FSK signal of a frequency $f_k$ in which said FSK signal is of a pulse duration $1/f_k$;

means for selecting only the FSK signal of a frequency $f_k$ from said received signal;

range gate blanking means for inhibiting any received signals from being processed by said range channel during the FSK pulse duration;

means for generating a range doppler signal from said FSK signal of a frequency $f_k$;

means for converting said range doppler signal to an alarm signal;

alarm means coupled to the alarm signals generated by said FM/CW channel and said range channel for generating an alarm signal only when said two alarm signals are concurrently coupled thereto.

4. An FM/CW surveillance radar system with range gating, comprising:

an antenna for continuously transmitting a transmitted signal of a frequency
$$f_{trans} = f_c \pm f_m \pm f_k$$
and for receiving a received signal of a frequency
$$f_{rec} = f_c \pm f_m \pm f_d \pm f_k$$
where
$f_c$ = carrier signal frequency
$f_m$ = frequency modulating signal frequency
$f_d$ = dopper signal frequency
$f_k$ = frequency shift keyed signal frequency;

an FM/CW channel coupled to said antenna for receiving said received signal and including;

means for selecting the $J_l$ component signal of a frequency $f_d = f_m$ of said receiving signal;

means for FM demodulating said $J_l$ component signal;

means for passing only the doppler signal from said FM demodulatued $J_l$ component signal that is above a threshold level;

means for converting said passed doppler signal to a digital signal;

a range channel coupled to said antenna for receiving said received signal and including;

means for frequency shift keying (FSK) said frequency modulated signal of a frequency $f_m$ by an FSK signal of a frequency $f_k$ in which said FSK signal is of a pulse duration $1/f_k$;

means for selecting only the FSK signal of a frequency $f_k$ from said received signal;

range gate blanking means for inhibiting any received signals from being processed by said range channel during the FSK pulse duration time;

means for generating a range doppler signal from said digital signal;

a logic gate coupled to the digital signals generated by said FM/CW channel and said range channel for generating an alarm signal only when said two digital signals are concurrently coupled thereto.

5. An FM/CW surveillance radar system with range gating, comprising:

a transmit-receive antenna;

a circulator coupled to said antenna for directing the transmitted signal to said antenna and for directing the received signal from said antenna to the receiver;

oscillator means for generating a CW signal of a carrier frequency $f_c$ that is coupled to said antenna for continuous transmission therefrom;

control means coupled to said oscillator means for frequency modulating said CW signal of a frequency $f_c$ by a frequency modulating signal of a frequency $f_m$ and generating an FM/CW signal of a frequency $f_c \pm f_m$;

an FM/CW channel coupled to said circulator for receiving a received signal and including;

filter means for selecting the $J_l$ component signal of a frequency $f_d + f_m$ of said received signal;

demodulator means for FM demodulating said $J_l$ component signal;

filter means for passing only the doppler signal of a frequency $f_d$ from said FM demodulator $J_l$ component signal that is above a threshold level;

detector means for comparing said doppler signal to a threshold level for passing only a doppler signal that is above said threshold level;

means for converting said passed doppler signal to an alarm signal;

a range channel coupled to said circulator for receiving said received signal and including;

means coupled to said control means for frequency shift keying (FSK) said FM/CW signal of a frequency $f_c \pm f_m$ by an FSK signal of a frequency $f_k$ and of a given pulse duration;

filter means for passing only the FSK signal of a frequency $f_k$ from a received signal;

sample-and-hold means for storing the peak amplitude of said passed FSK signal received during a specified range gate width;

range gating means for gating ON said sample-and-hold means only during said specified range gate width;

means for generating a range doppler signal from said peak amplitude stored in said sample-and-hold means;

means for comparing said range doppler signal to a threshold level for passing only a range doppler signal above said threshold level;

means for converting said passed range doppler signal to an alarm signal;

alarm means coupled to the alarm signals generated by said FM/CW channel and said range channel for generating an alarm signal only when said two alarm signals are concurrently coupled thereto.

6. An FM/CW surveillance radar system with range gating, comprising:

a transmit-receive antenna;

a circulator coupled to said antenna directing signals from the transmitter to said antenna and from said antenna to the receiver for transmitting a transmitted signal of a frequency
$$f_t = f_c \pm f_m \pm f_k$$
and for receiving a received signal of a frequency
$$f_r = f_c \pm f_m \pm f_d \pm f_k$$
where
$f_c$ = carrier signal frequency
$f_m$ = frequency modulating signal frequency $f_d$ = doppler signal frequency
$f_k$ = frequency shift keyed signal frequency;
a mixer coupled to said antenna for mixing said transmitted signal and said received signal;
a gunn-effect oscillator that is varactor tuned for frequency modulation of a CW output signal of a carrier frequency $f_c$ that is coupled to said antenna and that is continuously transmitted therefrom;
a varactor supply coupled to said gunn-effect oscillator for frequency modulating said CW output signal of a frequency $f_c$ by a frequency modulating signal of a frequency $f_m$;
an FM/CW channel coupled to said mixer for receiving said received signal and including;
    means for selecting the $J_t$ component signal of a frequency $f_d + f_m$ of said received signal;
    means for FM demodulating said $J_t$ component signal;
    means for passing only the doppler signal of a frequency $f_d$ from said FM demodulated $J_t$ component signal;
    means for comparing said doppler signal to a threshold level for passing only a doppler signal above said threshold level;
    means for converting said passed doppler signal to a digital signal;
a range channel coupled to said circulator for receiving said received signal and including;
    means coupled to said varactor supply for frequency shift keying (FSK) said frequency modulating signal of a frequency $f_m$ by a pulsed FSK signal of a frequency $f_k$ in which said FSK signal is of a pulse duration $1/f_k$;
    means for selecting only the FSK signal of a frequency $f_k$ from said received signal;
    range gate blanking means for inhibiting any signals from being processed during said FSK pulse duration;
    sample-and-hold means for storing the peak amplitude of the signal received during a specified range gate width as established by successive FSK signals;
    means for generating a range doppler signal from said sample-and-hold-means;
    means for comparing said range doppler signal to a threshold level for passing only a range doppler signal above said threshold level;
    means for converting said passed range doppler signal to a digital signal;
a logic gate coupled to the digital signals generated by said FM/CW channel and said range channel for generating an alarm signal only when said two digital signals are concurrently coupled thereto.

7. An FM/CW surveillance radar system with range gating, comprising:
a transmit-receive antenna;
a circulator coupled to said antenna directing the signal from the transmitter to said antenna and the received signal from said antenna to the receiver for transmitting a transmitted signal of a frequency
$f_{trans} = f_c \pm f_m \pm f_k$
and for receiving a received signal of a frequency
$f_{rec} = f_c \pm f_m \pm f_d \pm f_k$
where
$f_c$ = carrier signal frequency
$f_m$ = frequency modulating signal frequency
$f_d$ = doppler signal frequency $f_k$ = frequency shift keyed signal frequency;
a gunn-effect oscillator that is varactor tuned for frequency modulation of a CW output signal of a carrier frequency $f_c$ that is coupled to said antenna for continuous transmission therefrom;
a varactor supply coupled to said gunn-effect oscillator for frequency modulating said CW output signal of a frequency $f_c$ by a frequency modulating signal of a frequency $f_m$;
a gunn-effect oscillator supply coupled to said gunn-effect oscillator for generating said CW output signal of a carrier frequency $f_c$;
an FM/CW channel coupled to said circulator for receiving said receiving signal and including;
    means for selecting the $J_t$ component signal of a frequency $f_d + f_m$ of said receiving signal;
    means for FM demodulating said $J_t$ component signal;
    means for passing only the doppler signal of a frequency $f_d$ from said FM demodulated $J_t$ component signal that is above a threshold level;
    means for comparing said doppler signal to a threshold level for passing only a doppler signal that is above said threshold level;
    means for converting said passed doppler signal above said threshold level to a digital signal;
a range channel coupled to said circulator for receiving said received signal and including;
    means coupled to said varactor supply for frequency shift keying (FSK) said frequency modulating signal of a frequency $f_m$ by an FSK signal of a frequency $f_k$ in which said FSK signal is of a pulse duration $1/f_k$;
    means for selecting only the FSK signal of a frequency $f_k$ from said received signal;
    range gate blanking means for inhibiting any received signals from being processed during the FSK pulse duration;
    sample-and-hold means for storing the peak amplitude of the FSK signal received during a specified range gate width;
    means for generating a range doppler signal from said peak amplitude stored in said sample-and-hold means;
    means for comparing said range doppler signal to a threshold level for passing only a range doppler signal above said threshold level;
    means for converting said passed range doppler signal above said threshold level to a digital signal;
a logic gate coupled to the digital signals generated by said FM/CW channel and said range channel for generating an alarm signal only when said two digital signals are concurrently coupled thereto.

8. An FM/CW surveillance radar system with range gating, comprising:
an antenna for continuously transmitting a transmitted signal and for receiving a received signal;
a CW channel coupled to said antenna for receiving said received signal and including means for converting said received signal to a CW channel alarm signal;
a range channel coupled to said antenna for receiving said received signal and including;
    FSK means for frequency shift keying, only over a range gate blanking period, a CW signal that is to be transmitted by said antenna;

range gate blanking means for enabling said received signal to be processed by said range channel only if said received signal is received between successive ones of said range gate blanking periods; and, means for converting said processed received signal to a range channel alarm signal;

alarm means coupled to the alarm signals generated by said CW channel and said range channel for generating an alarm signal only when said CW channel alarm signal and said range channel alarm signal are concurrently coupled thereto.

9. The radar system of claim 8 including oscillator means coupling said CW signal that is to be transmitted to said antenna, said oscillator means responsively coupled to said FSK means for frequency modulating said CW signal only over successive ones of said range gate blanking periods, said successive ones of said range gate blanking periods being separated by a range signal processing period.

10. The radar system of claim 9 in which:

said CW channel includes a threshold detector for converting said received signal to said CW channel alarm signal only if above a preset level indicative of a preset target size;

said range channel includes a threshold detector for converting said received signal to said range channel alarm signal only if within said range signal processing period.

* * * * *

UNITED STATES PATENT OFFICE
CERTIFICATE OF CORRECTION

PATENT NO. : 3,932,871
DATED : January 13, 1976
INVENTOR(S) : Owen L. Foote

It is certified that error appears in the above-identified patent and that said Letters Patent are hereby corrected as shown below:

Column 3, Line 49, "lf" should be -- If --.

Column 4, Line 42, "$f_d + (f_d + f_m) + (f_d + f_m) + (f_d + 2f_m) + (f_d -$" should be -- $f_d + (f_d + f_m) + (f_d - f_m) + (f_d + 2f_m) + (f_d -$ --.

Column 6, Line 54, "than" should be -- then --.

Column 10, Line 39, "and" should be --said --.

Column 11, Line 10, "and" should be -- said --.

Line 47, "demodulatued" should be -- demodulated --

Line 64, "digital" should be -- FSK --.

Line 65, should be -- means for converting said range doppler signal to a digital signal; --.

Column 12, Line 23, "demodulator" should be -- demodulated --.

Signed and Sealed this

*first* Day of *June 1976*

[SEAL]

Attest:

RUTH C. MASON
*Attesting Officer*

C. MARSHALL DANN
*Commissioner of Patents and Trademarks*